(12) United States Patent
Kadowaki et al.

(10) Patent No.: US 11,927,234 B2
(45) Date of Patent: Mar. 12, 2024

(54) VIBRATION PROOFING DEVICE AND BRACKET

(71) Applicants: YAMASHITA RUBBER CO., LTD., Fujimino (JP); HONDA MOTOR CO., LTD., Tokyo (JP)

(72) Inventors: Hirokazu Kadowaki, Saitama (JP); Masataka Hirano, Saitama (JP); Yusuke Arai, Saitama (JP)

(73) Assignees: YAMASHITA RUBBER CO., LTD., Fujimino (JP); HONDA MOTOR CO., LTD., Tokyo (JP)

( * ) Notice: Subject to any disclaimer, the term of this patent is extended or adjusted under 35 U.S.C. 154(b) by 64 days.

(21) Appl. No.: 17/617,509

(22) PCT Filed: Jun. 3, 2020

(86) PCT No.: PCT/JP2020/022010
§ 371 (c)(1),
(2) Date: Dec. 8, 2021

(87) PCT Pub. No.: WO2020/250785
PCT Pub. Date: Dec. 17, 2020

(65) Prior Publication Data
US 2022/0260131 A1  Aug. 18, 2022

(30) Foreign Application Priority Data
Jun. 11, 2019  (JP) .................................. 2019-109009

(51) Int. Cl.
*F16F 1/36*  (2006.01)
*B60K 5/12*  (2006.01)
(Continued)

(52) U.S. Cl.
CPC ................. *F16F 13/10* (2013.01); *B60K 5/12* (2013.01); *B60K 5/1208* (2013.01); *F16F 1/36* (2013.01);
(Continued)

(58) Field of Classification Search
CPC ........ F16F 13/10; F16F 2226/045; F16F 1/36; F16F 1/3849; F16F 15/08; B60K 5/1208
See application file for complete search history.

(56) References Cited

U.S. PATENT DOCUMENTS 8,403,097 B2 *  3/2013  Joly ........................ F16F 1/373
                                                      267/140.13
9,739,333 B2 *  8/2017  Michiyama .......... B60K 5/1208
(Continued)

FOREIGN PATENT DOCUMENTS

CN      107448531 A     12/2017
JP      2016-75343       5/2016
(Continued)

OTHER PUBLICATIONS

International Search Report, dated Aug. 25, 2020, 2 pages.
Chinese Office Action corresponding to Chinese Application No. 202080038587.9 dated Feb. 22, 2023, 20 pages.

*Primary Examiner* — Bradley Duckworth
(74) *Attorney, Agent, or Firm* — Rankin, Hill & Clark LLP

(57) ABSTRACT

A vibration proofing device includes a bracket having an internal space, and a vibration proofing member inserted into the internal space. The internal space is open on an outer surface of the bracket. At least a pair of facing-each-other surfaces, against which the vibration proofing member is pressed, is formed in an inner surface of the bracket. A distance between the pair of the facing-each-other surfaces on a far side in an insertion direction of the vibration proofing member is the same, in at least some regions of the (Continued)

bracket, as that on a near side in the insertion direction. This provides the vibration proofing device and the bracket to allow for compactly configuring the device as a whole, while sufficiently securing a retaining force between the bracket and the vibration proofing member.

7 Claims, 8 Drawing Sheets

(51) Int. Cl.
  *F16F 1/38* (2006.01)
  *F16F 13/10* (2006.01)
  *F16M 13/02* (2006.01)

(52) U.S. Cl.
  CPC .......... *F16F 1/3849* (2013.01); *F16F 13/103* (2013.01); *F16M 13/02* (2013.01); *F16F 2226/045* (2013.01)

(56) References Cited

U.S. PATENT DOCUMENTS

| | | | | |
|---|---|---|---|---|
| 10,415,665 B2 * | 9/2019 | Goto | ..................... | F16F 13/103 |
| 10,906,384 B2 * | 2/2021 | Kadowaki | ............. | F16F 1/3849 |
| 10,988,015 B2 * | 4/2021 | Gutierrez | .............. | F02F 7/0082 |
| 11,454,295 B2 * | 9/2022 | Kondo | .................... | F16F 15/08 |
| 11,466,751 B2 * | 10/2022 | Kadowaki | ............... | F16F 13/10 |
| 2006/0043656 A1 * | 3/2006 | Shimizu | ................ | F16F 1/3849 |
| | | | | 267/140.13 |
| 2007/0178258 A1 * | 8/2007 | Petit | ........................ | F16F 13/10 |
| | | | | 428/34.1 |
| 2015/0276010 A1 * | 10/2015 | Nakamura | .............. | F16F 15/08 |
| | | | | 248/634 |
| 2017/0305254 A1 * | 10/2017 | Kadowaki | ............... | F16F 15/08 |
| 2017/0341500 A1 * | 11/2017 | Oki | ...................... | B60K 5/1208 |
| 2018/0030581 A1 * | 2/2018 | Michiyama | ............... | C22F 1/04 |
| 2019/0168595 A1 * | 6/2019 | Tanaka | .................. | F16F 13/103 |
| 2021/0283966 A1 * | 9/2021 | Matsumoto | ........... | F16F 1/3849 |

FOREIGN PATENT DOCUMENTS

| | | | | |
|---|---|---|---|---|
| JP | 2016-138613 | | 8/2016 | |
| JP | 2017-219180 | | 12/2017 | |
| WO | 2016/080047 A1 | | 5/2016 | |
| WO | WO-2016080047 A1 * | | 5/2016 | ............... B60K 5/12 |
| WO | WO-2018047845 A1 * | | 3/2018 | ............... B60K 5/12 |

* cited by examiner

FIG. 7
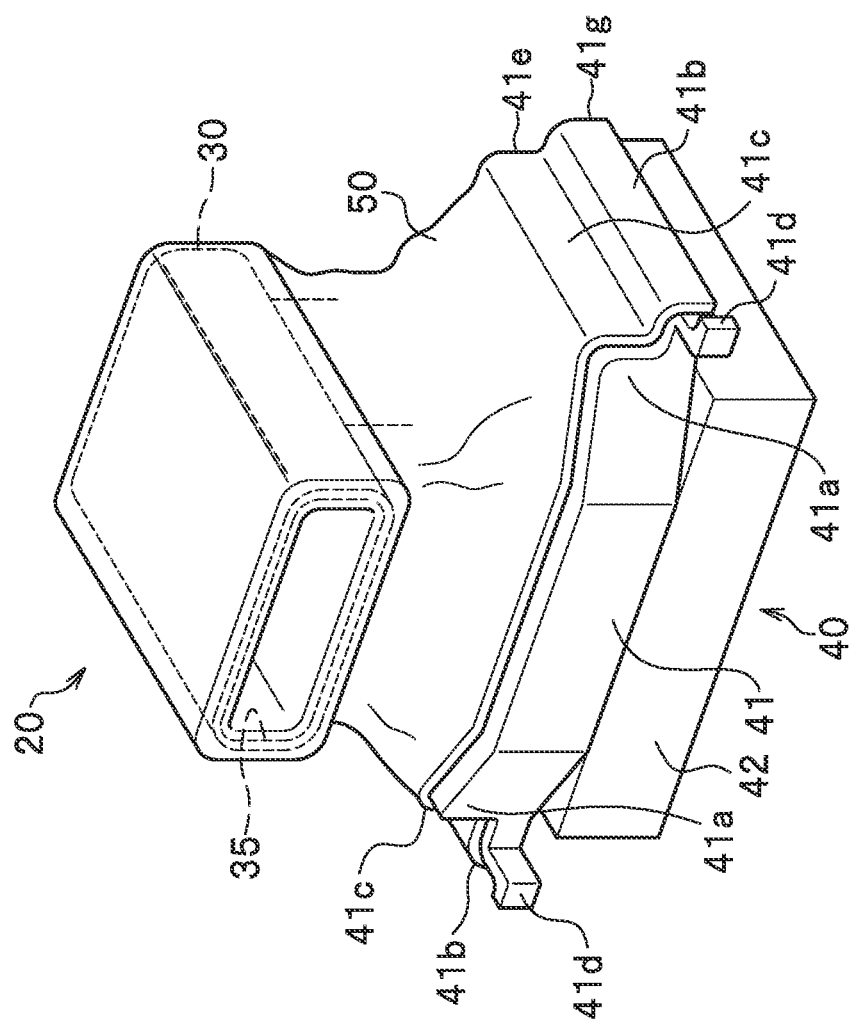
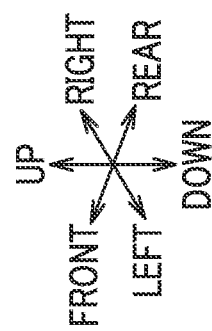

VIBRATION PROOFING DEVICE AND BRACKET

CROSS-REFERENCE TO RELATED APPLICATION

This application is a U.S. National Stage Application under 35 U.S.C § 371 of International Patent Application No. PCT/JP20201022010 filed on 3 Jun. 2020, which claims the benefit of priority to Japanese Patent Application No. 2019-109009 filed on 11 Jun. 2019, the disclosures of all of which are hereby incorporated by reference in their entireties

TECHNICAL FIELD

The present invention relates to a vibration proofing device and a bracket.

BACKGROUND OF THE INVENTION

A vibration proofing device to cause a prime mover, such as an engine and a motor of an automobile, to be supported by a vehicle body is provided between the prime mover and the vehicle body. The vibration proofing device includes a bracket for a vehicle body, having an internal space, and a vibration proofing member inserted in the internal space. The bracket for a vehicle body is a member to be attached to the vehicle body. A bracket for a prime mover attached to the prime mover is to be attached to the vibration proofing member.

The vibration proofing member is press-fitted into the bracket for a vehicle body. The bracket for a vehicle body is formed, on an inner surface thereof, with press-fit surfaces against which side surfaces of the vibration proofing member are pressed. In a conventional vibration proofing device, the heights of the press-fit surfaces of the bracket for a vehicle body are increased to increase areas of the bracket pressed against the vibration proofing member, to secure a retaining force between the bracket and the vibration proofing member (see Japanese Patent Application Publication No. 2016-075343 A, for example).

SUMMARY OF THE INVENTION

Problems to be Solved

In a case where the heights of the press-fit surfaces of the bracket for a vehicle body are increased as with the conventional vibration proofing device described above, the heights of the vibration proofing member and the bracket are increased, to have the height of the device increased as a whole.

The present invention is intended to provide a vibration proofing device and a bracket to solve the above-mentioned problems and to allow for compactly configuring the device as a whole, while sufficiently securing a retaining force between the bracket and the vibration proofing member.

Solution to Problem

In order to solve the above-mentioned problems, the present invention provides a vibration proofing device including a bracket having an internal space, and a vibration proofing member inserted into the internal space. The internal space is open on an outer surface of the bracket. The bracket is formed, in an inner surface thereof, with at least a pair of facing-each-other surfaces, against which the vibration proofing member is pressed. A distance between the pair of facing-each-other surfaces on a far side in an insertion direction of the vibration proofing member is the same, in at least some regions of the bracket, as that on a near side in the insertion direction. A pair of press-fit grooves, into which a pair of attaching portions formed on the vibration proofing member is press-fitted, is formed in an inner surface of the bracket at positions horizontally facing each other, so as to extend from an opening edge of the internal space toward the far side. A pair of press-fit surfaces is formed in the inner surface of the bracket at positions facing each other in the horizontal direction so as to extend from the opening edge of the internal space toward the far side, to have a pair of contact portions, formed on the vibration proofing member, respectively press-fitted. The press-fit groove is formed along a lower edge of the press-fit surface, and is recessed outward with respect to the press-fit surface. The at least a pair of facing-each-other surfaces includes a pair of groove bottom surfaces, facing each other in a horizontal direction of the pair of press-fit grooves, a pair of groove side surfaces, facing each other in a vertical direction of each of the press-fit grooves, and the pair of press-fir surfaces.

In the vibration proofing device of the present invention, having the vibration proofing member inserted into the internal space of the bracket, the vibration proofing member is pressed against, in a state of being caught between, the pair of facing-each-other surfaces formed in an inner surface of the bracket. Thus, the vibration proofing member receives elastic reaction forces from the pair of facing-each-other surfaces of the bracket. The vibration proofing member is caught in the middle and retained by such elastic reaction forces acting from both sides. However, in a conventional technique, an inner surface of a bracket is formed to have a draft angle so as to be skewed to spread from the far side toward the near side, in order to allow the mold to be smoothly released at the time of molding the bracket. Thus, an elastic reaction force acting on a vibration proofing member has a component in a direction opposite to an insertion direction (removal direction) of the vibration proofing member. Accordingly, in the conventional technique, a force in the removal direction is always applied by the elastic reaction force to the vibration proofing member, to have a risk that the vibration proofing member could not be stably retained inside the bracket. In contrast, in the present invention, a distance between the pair of facing-each-other surfaces on the far side is the same as that on the near side, and thus the elastic reaction force acting on the vibration proofing member has only a component in a direction orthogonal to the insertion direction of the vibration proofing member. As a result, there is no force in the removal direction acting on the vibration proofing member, to allow the vibration proofing member to be stably retained inside the bracket. Even if the areas of the bracket pressed against the vibration proofing member are reduced as compared with conventional cases, the retaining force between the bracket and the vibration proofing member is secured. In other words, the present invention provides a vibration proofing device to allow for compactly configuring the device as a whole, while sufficiently securing a retaining force between the bracket and the vibration proofing member. In addition, the pair of attaching portions of the vibration proofing member is caught in the middle by elastic reaction forces acting from both sides in the horizontal direction due to the pair of groove bottom surfaces, and is caught in the middle by elastic reaction forces acting from both sides in the vertical direction due to the pair of groove side surfaces. In this manner, the surfaces inside the press-fit grooves allow for using a smaller space to secure areas of the bracket pressing against the vibration proofing member. This allows for compactly configuring the vibration proofing device as a whole, while sufficiently securing the retaining force between the bracket and the vibration proofing member. Further, the pair of contact portions of the vibration proofing member is caught in the middle by elastic reaction forces acting from both sides in the horizontal direction due to the pair of press-fit surfaces.

In the vibration proofing device, the at least a pair of facing-each-other surfaces preferably includes a pair of horizontally-facing-each-other surfaces, facing each other in the horizontal direction. In this configuration, the vibration proofing member is caught in the middle by elastic reaction forces acting from both sides in the horizontal direction, and is stably retained inside the bracket.

In the vibration proofing device, the at least a pair of facing-each-other surfaces preferably includes a pair of vertically-facing-each-other surfaces, facing each other in the vertical direction. In this configuration, the vibration proofing member is caught in the middle by elastic reaction forces acting from both sides in the vertical direction, and is stably retained inside the bracket.

In the vibration proofing device described above, the surfaces of each of the pair of attaching portions facing the surfaces inside each of the pair of press-fit grooves are preferably covered with an elastic member. In this configuration, the elastic member is caught between the surfaces inside the press-fit groove and the outer surfaces of the attaching portion, to allow the attaching portion to be reliably press-fitted into the press-fit groove.

In the vibration proofing device, the bracket includes a top portion and two leg portions extending downward from the top portion, to define the internal space between the two leg portions. Inner surfaces of the leg portions are preferably formed with the at least a pair of facing-each-other surfaces. This configuration sufficiently secures the retaining force between the bracket and the vibration proofing member, without increasing the heights of the facing-each-other surfaces, to allow for reducing the heights of the bracket and the vibration proofing member.

Preferably, the vibration proofing member includes a first attaching member, a second attaching member, and an insulator interposed between the first attaching member and the second attaching member, wherein the contact portion and the attaching portion are formed on an outer surface of the second attaching member, the contact portion is formed by an upper peripheral wall portion and an elastic member covering an outer surface of the upper peripheral wall portion, the attaching portion is formed by a protruding portion protruding outward from a lower end of the upper peripheral wall portion, and an elastic member covering the protruding portion, and the elastic member covering the upper peripheral wall portion and the elastic member covering the protruding portion are formed by a part of the insulator. Preferably, surfaces of the attaching portion facing a groove bottom surface and an upper groove side surface inside the press-fit groove are covered with an elastic member, leaving a surface of the attaching portion facing a lower groove side surface inside the press-fit groove not covered with the elastic member. Preferably, the vibration proofing member includes an upper peripheral wall portion in a tubular shape, and a protruding portion protruding outward from a lower end of the upper peripheral wall portion, the attaching portion is formed by the protruding portion, and the contact portion is formed by the upper peripheral wall portion. In addition, the present invention provides a bracket having an internal space into which a vibration proofing member can be inserted, to solve the above-mentioned problems. The internal space is open on the outer surface of the bracket. The bracket is formed in its inner surface with at least a pair of facing-each-other surfaces, against which the vibration proofing member is pressed. A distance between the pair of facing-each-other surfaces on a far side in an insertion direction of the vibration proofing member is the same, in at least some regions of the bracket, as that on a near side in the insertion direction. A pair of press-fit grooves, into which a pair of attaching portions formed on the vibration proofing member is press-fitted, is formed in an inner surface of the bracket at positions horizontally facing each other, so as to extend from an opening edge of the internal space toward the far side. A pair of press-fit surfaces is formed in the inner surface of the bracket at positions facing each other in the horizontal direction so as to extend from an opening edge of the internal space toward the far side, to have a pair of contact portions, formed on the vibration proofing member, respectively press-fitted. The press-fit groove is formed along a lower edge of the press-fit surface, and is recessed outward with respect to the press-fit surface. The at least a pair of facing-each-other surfaces includes a pair of groove bottom surfaces, facing each other in a horizontal direction of the pair of press-fit grooves, a pair of groove side surfaces, facing each other in a vertical direction of each of the press-fit grooves, and the pair of press-fit surfaces. Accordingly, the present invention provides a bracket to allow for compactly configuring the device as a whole, while sufficiently securing a retaining force between the bracket and the vibration proofing member.

Advantageous Effects of the Invention

The present invention provides a vibration proofing device and a bracket to allow for compactly configuring the device as a whole, while sufficiently securing a retaining force between the bracket and the vibration proofing member.

BRIEF DESCRIPTION OF DRAWINGS

FIG. 7 is a perspective view of a vibration proofing member of the vibration proofing device according to the embodiment of the present invention.

EMBODIMENTS OF THE INVENTION

Figure 2:
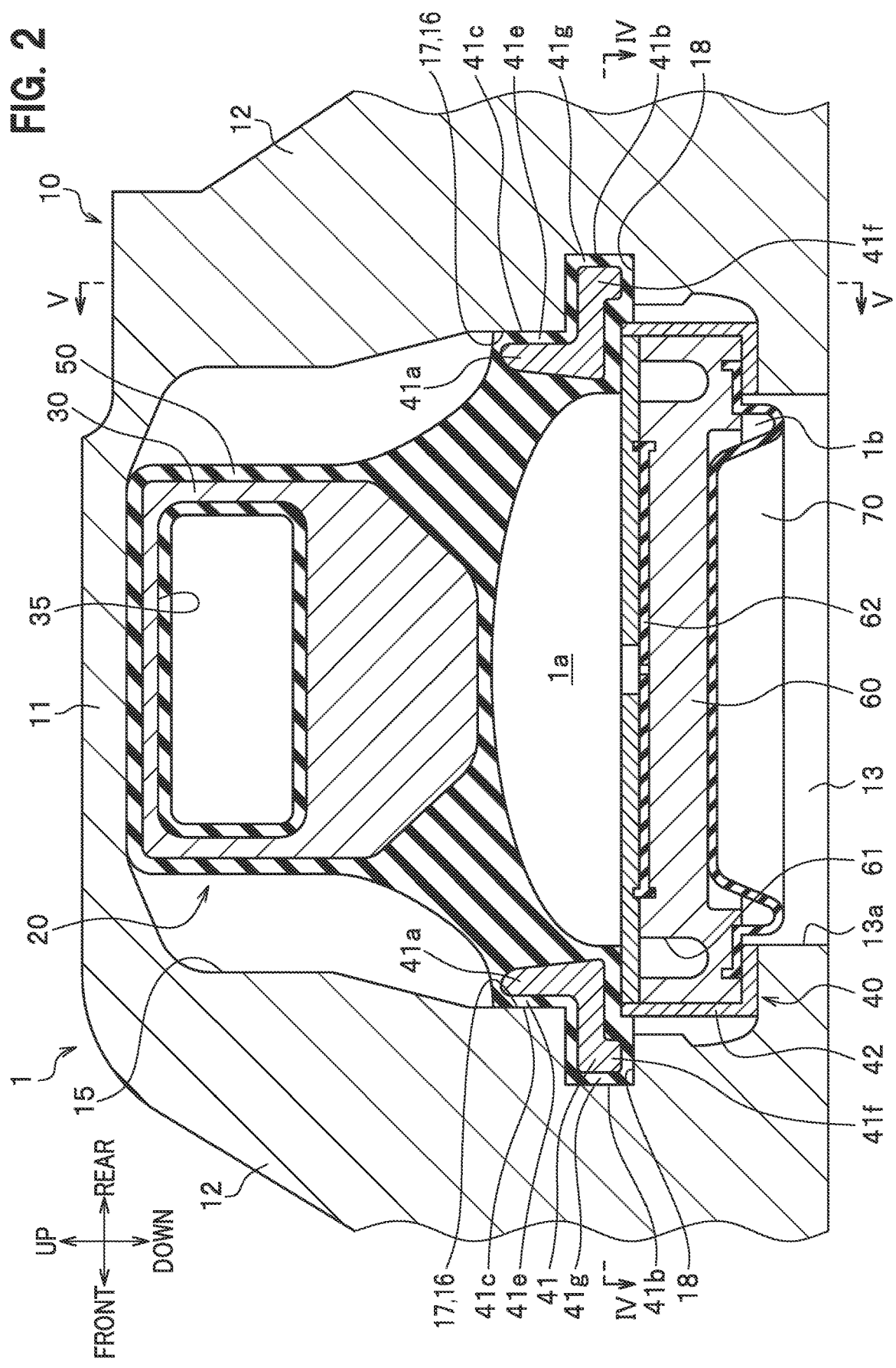
FIG. 2 is a cross-sectional view of the vibration proofing device according to the embodiment of the present invention, taken along a line II-II in FIG. 1.

A description is given in detail of an embodiment of the present invention, with reference to the drawings as required. Note that in the following description, an up-down direction, a front-rear direction, and a right-left direction are set for the purpose of illustrating a vibration proofing device of the present embodiment, and are not intended to limit the configuration and installation of the vibration proofing device of the present invention. In the present embodiment, the upper side of the plane of paper in FIG. 2 is upward, while the lower side of the plane of paper in FIG. 2 is downward. In addition, the left side of the plane of paper in FIG. 2 is frontward, while the right side of the plane of paper in FIG. 2 is rearward. Further, the far side of the plane of paper in FIG. 2 is rightward, while the near side of the plane of paper in FIG. 2 is leftward. In the drawings of the present embodiment, parts of a vibration proofing device 1 are appropriately exaggerated and simplified in order to clearly indicate features of the present invention.

Figure 1:
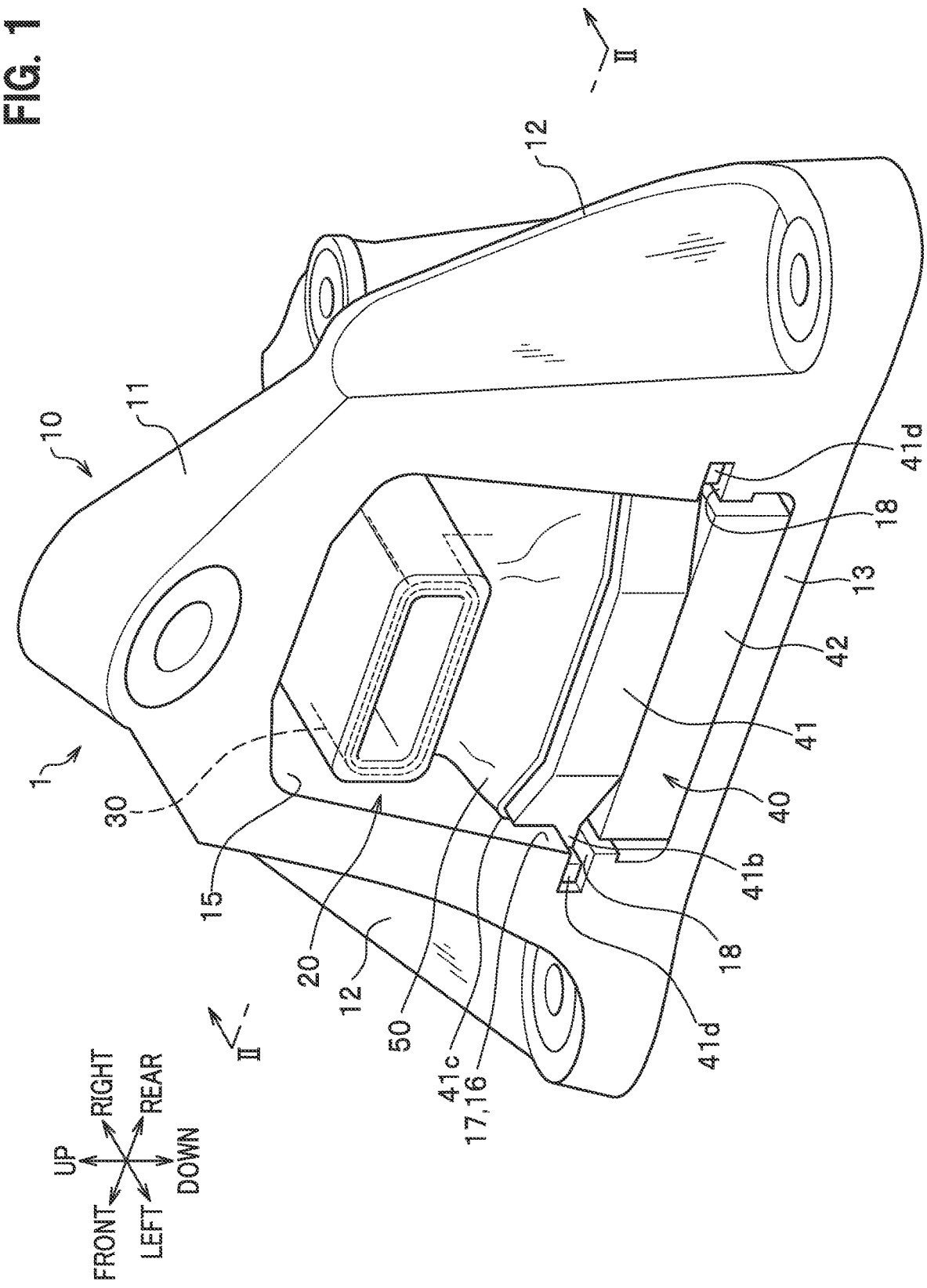
FIG. 1 is a perspective view of a vibration proofing device according to an embodiment of the present invention.

As shown in FIG. 1, the vibration proofing device 1 of the present embodiment is interposed between an engine and a vehicle body, for example, of a vehicle such as an automobile. Hereinafter, a description is given, with the engine as an object of vibration proofing. The vibration proofing device 1 includes a bracket for a vehicle body (hereinafter, also simply referred to as a "bracket") 10, and a vibration proofing member 20 attached to the bracket 10.

Figure 6:
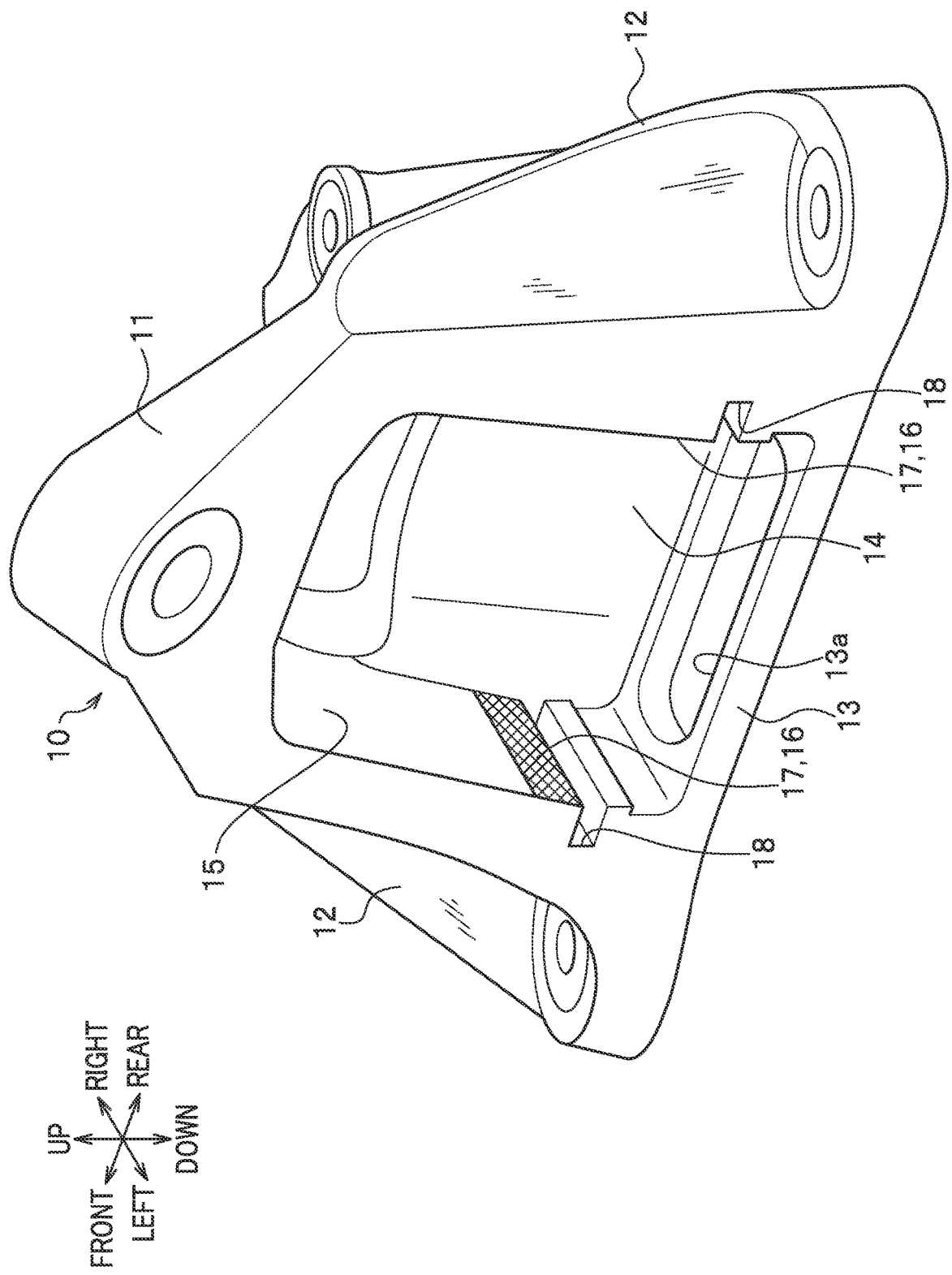
FIG. 6 is a perspective view of a bracket for vehicle body of the vibration proofing device according to the embodiment of the present invention.

The bracket 10 is a member made of resin or metal to be attached to the vehicle body. The bracket 10 of the present embodiment is a member made of resin. As shown in FIG. 6, the bracket 10 includes a top portion 11, front and rear leg portions 12 extending downward from the top portion 11, a bottom portion 13 formed between lower ends of both of the leg portions 12, and a right wall portion 14 raised from a right edge of the bottom portion 13. An opening 13*a* vertically penetrates in a center of the bottom portion 13. A left end of the top portion 11 and lower ends of the leg portions 12 are to be attached to the vehicle body.

In the bracket 10, an internal space 15 is defined between the leg portions 12. The internal space 15 is a space surrounded by the top portion 11, the leg portions 12, and the bottom portion 13. The internal space 15 is open to the right and left sides of the bracket 10.

As shown in FIG. 2, the vibration proofing member 20 includes a first attaching member 30, a second attaching member 40, an insulator 50 interposed between the first attaching member 30 and the second attaching member 40, and a partition member 60 and a diaphragm 70 which are provided below the insulator 50. The vibration proofing member 20 of the present embodiment is a vibration proofing member of a liquid-sealed type.

The first attaching member 30 is a member in a square tubular shape made of metal and embedded in an upper end portion of the insulator 50 by insert molding. The first attaching member 30 has an attaching hole 35 penetrating therethrough in the right-left direction. A bracket for the engine (not shown) attached to the engine is inserted into the attaching hole 35 of the first attaching member 30. In this manner, the first attaching member 30 is attached to the engine.

The second attaching member 40 includes an upper member 41 embedded in a lower end portion of the insulator 50 by insert molding, and a lower member 42 arranged under the upper member 41. Note that the upper member 41 and lower member 42 of the present embodiment are made of resin, but may be made of metal.

Figure 3:
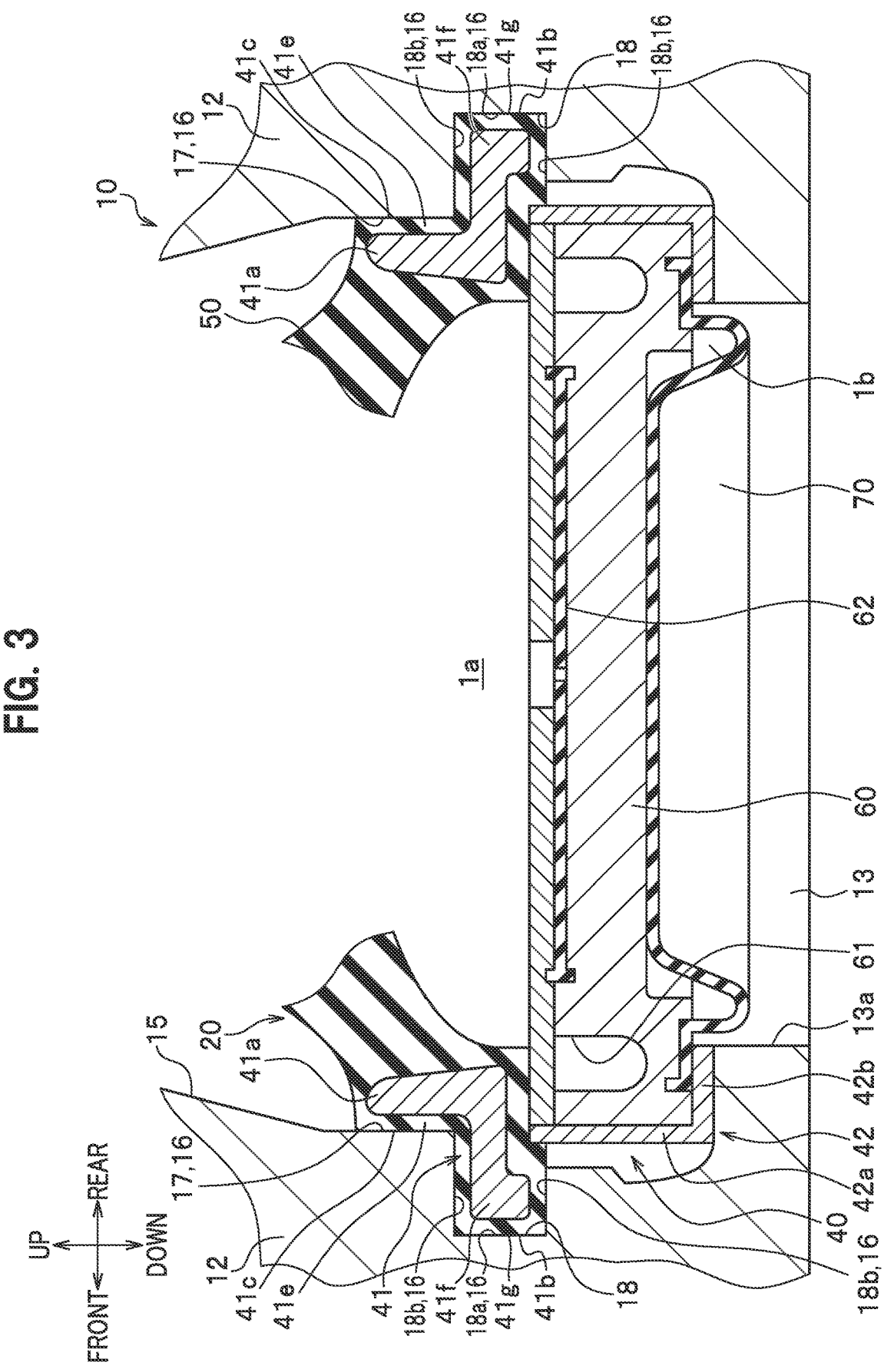
FIG. 3 is an enlarged cross-sectional view of an assembly structure of the vibration proofing device according to the embodiment of the present invention.

As shown in FIG. 3, the upper member 41 is formed with an upper peripheral wall portion 41*a* in a tubular shape, and a protruding portion 41*f* protruding outward from lower ends of front and rear outer surfaces of the upper peripheral wall portion 41*a*. The lower member 42 is formed with a lower peripheral wall portion 42*a* in a tubular shape, and a bottom plate 42*b* provided at a lower end of the lower peripheral wall portion 42*a*. The central portion of the bottom plate 42*b* is open.

The insulator 50 is an elastic member made of rubber, as shown in FIG. 2. Note that various rubber materials can be used for the insulator 50 of the present embodiment. The insulator 50 has the first attaching member 30 embedded therein, at the upper end portion thereof, by insert molding, and an upper end of the insulator 50 is formed in a square tubular shape. A lower end of the insulator 50 is formed in a square tubular shape along the peripheral wall portion of the upper member 41. The insulator 50 defines a space at a bottom thereof, with an opening to face downward.

As shown in FIG. 3, the partition member 60 is fitted in the lower peripheral wall portion 42*a* of the lower member 42, and is placed on an upper surface of the bottom plate 42*b* of the lower member 42. The partition member 60 is interposed between a lower surface of the insulator 50 and the upper surface of the bottom plate 42*b* of the lower member 42. The partition member 60 closes the opening at the bottom of the insulator 50. As shown in FIG. 2, a main liquid chamber 1*a* is defined above the partition member 60. The main liquid chamber 1*a* is a space surrounded by an inner surface of the lower portion of the insulator 50 and an upper surface of the partition member 60, and is filled with an incompressible hydraulic fluid.

The diaphragm 70 is provided under the partition member 60. The diaphragm 70 is a rubber film, and an outer peripheral portion of the diaphragm 70 is caught between a lower surface of the partition member 60 and the upper surface of the bottom plate 42*b* of the lower member 42, as shown in FIG. 3. An auxiliary liquid chamber 1*b* is defined between the partition member 60 and the diaphragm 70, as shown in FIG. 2. The auxiliary liquid chamber 1*b* is a space surrounded by the lower surface of the partition member 60 and an upper surface of the diaphragm 70, and is filled with an incompressible hydraulic fluid.

The partition member 60 is formed with an orifice passage 61 to communicate the main liquid chamber 1*a* with the auxiliary liquid chamber 1*b*. When vibration is inputted to the first attaching member 30, the hydraulic fluid passes through the orifice passage 61 so that liquid column resonance occurs between the main liquid chamber 1*a* and the auxiliary liquid chamber 1*b* to effectively attenuate the vibration. An elastic movable film 62 is provided at the center of the partition member 60. The elastic movable film 62 elastically deforms in response to a change in internal pressure within the main liquid chamber 1*a* to absorb fluctuation in internal pressure within the main liquid chamber 1*a*.

Next, a description is given of a structure of the present embodiment having the vibration proofing member 20 attached to the bracket 10. The vibration proofing member 20 is arranged in the internal space 15 of the bracket 10, as shown in FIG. 1. The vibration proofing member 20 is press-fitted between the leg portions 12 so as to be fixed to the bracket 10.

The leg portion 12 of the bracket 10 is formed, in an inner surface thereof, with a press-fit surface 17 and a press-fit groove 18, both extending in the right-left direction, as shown in FIG. 6. In the present embodiment, the press-fit surface 17 and the press-fit groove 18 are formed in the inner surface of each of the front and rear leg portions 12, as shown in FIG. 3. The front and rear press-fit surfaces 17 are symmetric to each other in the front-rear direction, and so are the front and rear press-fit grooves 18.

The press-fit surface 17 is formed in the inner surface of the leg portion 12 at a substantially center in the vertical direction. The press-fit surface 17 is a plane whose normal line is in the horizontal direction. The press-fit surface 17 extends in a band shape from the opening edge on the left side of the internal space 15 toward the far side (right side in FIG. 6), as shown in FIG. 6. The press-fit surface 17 is formed from a right edge to a left edge of the leg portion 12.

The pair of front and rear press-fit surfaces 17 constitute at least a pair of facing-each-other surfaces 16, against which the vibration proofing member 20 is pressed. The pair of press-fit surfaces 17 corresponds to a pair of horizontally-facing-each-other surfaces.

The press-fit groove 18 is a groove having a rectangular axial cross section and formed along a lower edge of the press-fit surface 17. The press-fit groove 18 is recessed outward with respect to the press-fit surface 17. The press-fit groove 18 extends linearly from the opening edge on the left side of the internal space 15 toward the far side (right side). The press-fit groove 18 is formed from the right edge to the left edge of the leg portion 12. The left end of the press-fit groove 18 is open to the left surface of the bracket 10.

As shown in FIG. 3, a pair of groove bottom surfaces 18a, facing each other in the horizontal direction, of the pair of front and rear press-fit grooves 18 constitutes at least the pair of facing-each-other surfaces 16, against which the vibration proofing member 20 is pressed. The pair of groove bottom surfaces 18a corresponds to a pair of horizontally-facing-each-other surfaces. In addition, a pair of groove side surfaces 18b, facing each other in the up-down direction, of the press-fit groove 18 constitutes at least the pair of facing-each-other surfaces 16, against which the vibration proofing member 20 is pressed. The pair of groove side surfaces 18b corresponds to a pair of vertically-facing-each-other surfaces.

Figure 4:
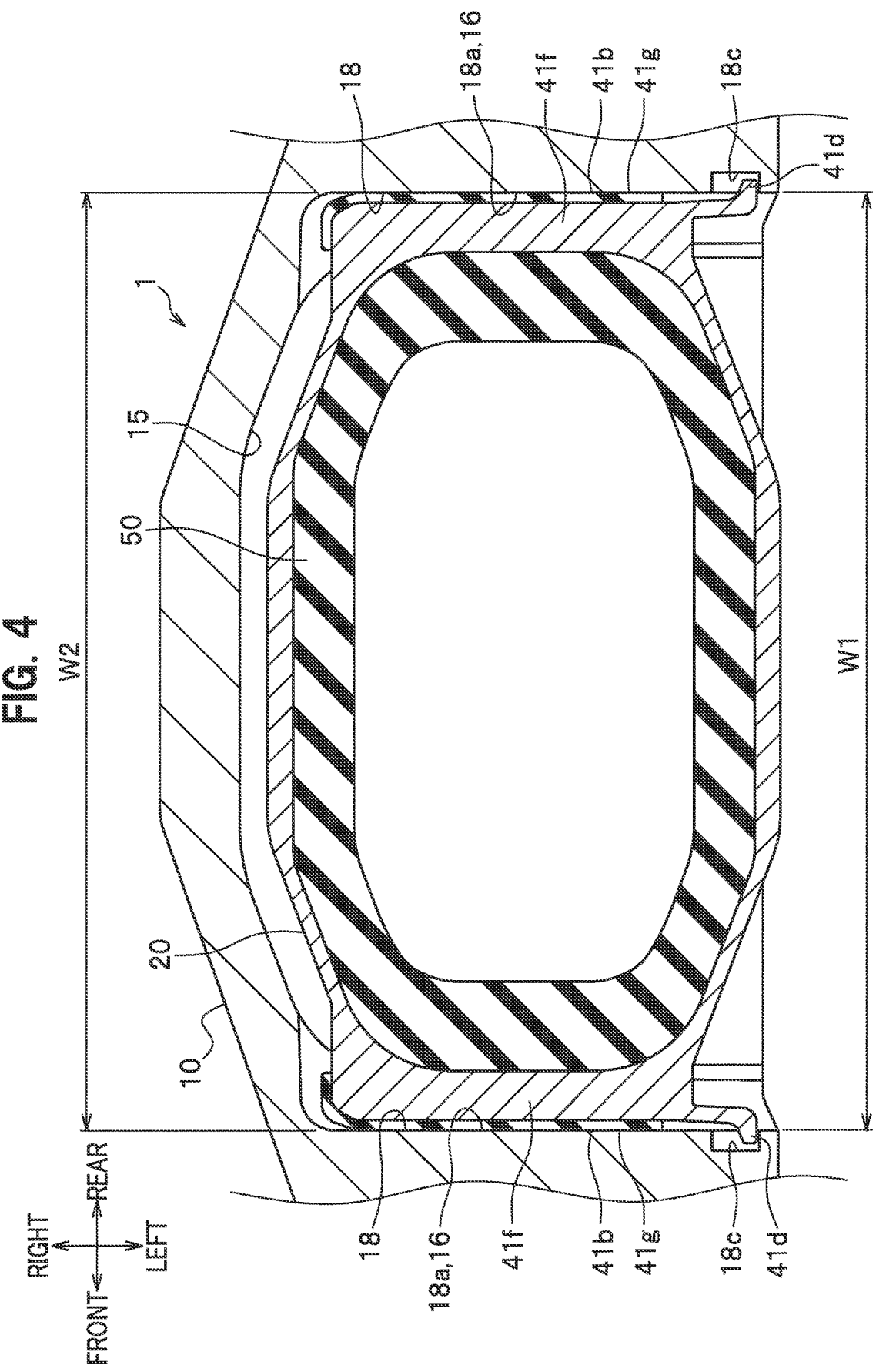
FIG. 4 is a cross-sectional view, taken along a line IV-IV in FIG. 2.

As shown in FIG. 4, a distance (width) between the pair of groove bottom surfaces 18a on the far side (distance W2) in the insertion direction (here, from left to right) of the vibration proofing member 20 is the same, in at least some regions of the bracket 10, as that on the near side (distance W1). In the present embodiment, at least some regions of the bracket 10 refers to regions against which the vibration proofing member 20 is pressed (the same applies hereinbelow). Here, a distance on the far side being "the same" as that on the near side is a concept to include not only "exactly the same" but also "substantially the same" to mean that one is considered to be the same as the other based on common technical knowledges (the same applies hereinbelow).

In other words, a pair of straight lines, as lines defined by the pair of groove bottom surfaces 18a intersecting a horizontal plane running through the pair of groove bottom surfaces 18a, is parallel to each other. Here, being parallel is a concept to include not only "strictly parallel" but also "substantially parallel" (e.g., a skew angle of one straight line with respect to the other straight line is 0.5 degrees or less) to mean that one is considered to be parallel to the other based on common technical knowledges (the same applies hereinbelow). Note that the lower member 42 and the like are not shown in FIG. 4.

Figure 5:
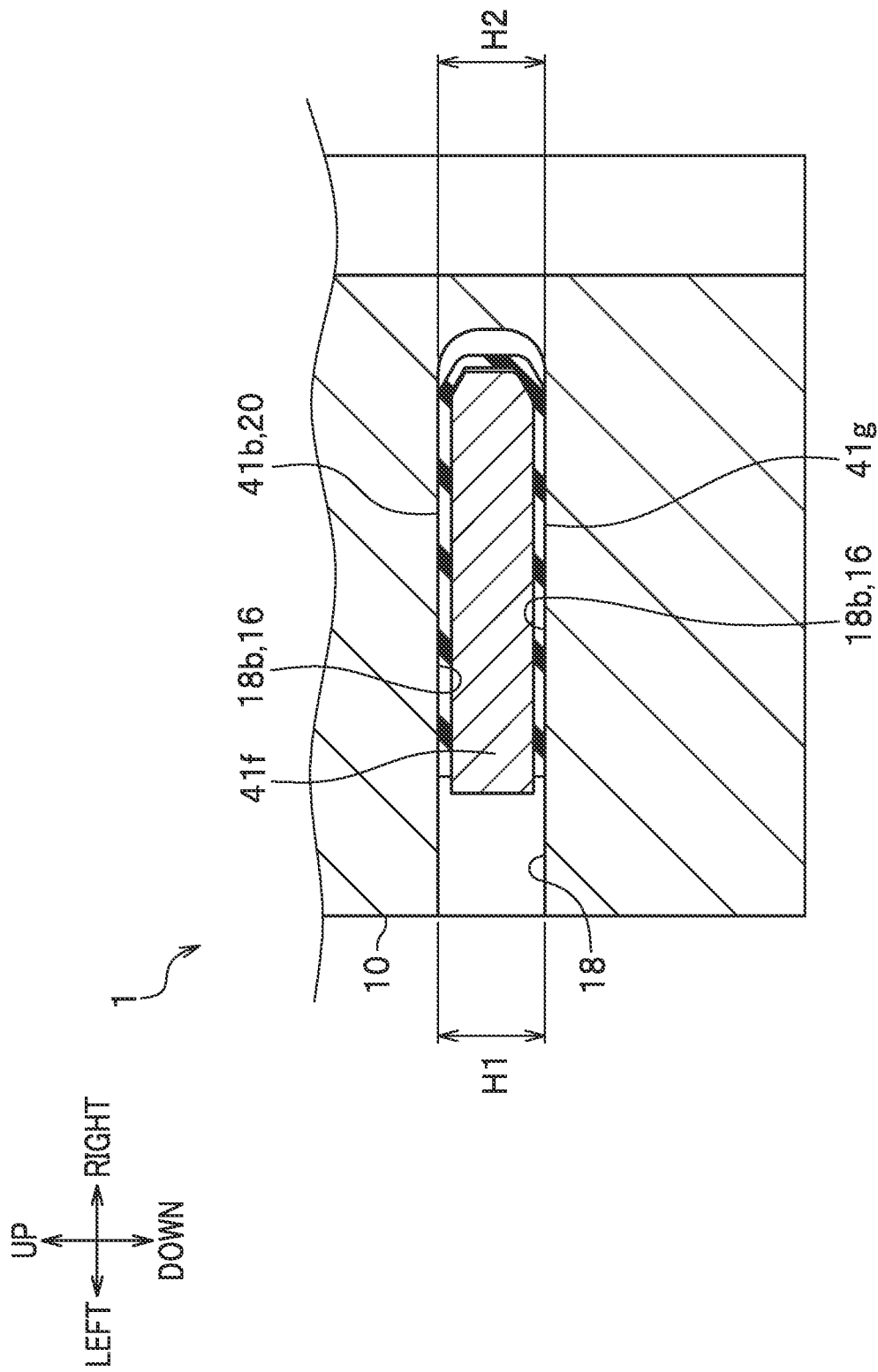
FIG. 5 is a cross-sectional view, taken along a line V-V in FIG. 2.

In addition, as shown in FIG. 5, a distance (height) between the pair of groove side surfaces 18b on the far side (distance H2) in the insertion direction of the vibration proofing member 20 is the same, in at least some regions of the bracket 10, as that on the near side (distance H1). In other words, a pair of straight lines, as lines defined by the pair of groove side surfaces 18b intersecting a vertical plane running through the pair of groove side surfaces 18b and running along an extending direction of the press-fit groove 18, is parallel to each other.

Further, as shown in FIG. 3, a distance (width) between the pair of press-fit surfaces 17 on the far side in the insertion direction of the vibration proofing member 20 is the same, in at least some regions of the bracket 10, as that on the near side. In other words, a pair of straight lines, as lines defined by the pair of press-fit surfaces 17 intersecting a horizontal plane running through the pair of press-fit surfaces 17, is parallel to each other.

As described above, at least the pair of facing-each-other surfaces 16, against which the vibration proofing member 20 is pressed, is formed in the inner surface of the bracket 10. In the present embodiment, at least the pair of facing-each-other surfaces 16 includes the pair of the press-fit surfaces 17, the pair of the groove bottom surfaces 18a, and the pair of the groove side surfaces 18b. A slide core movable in the front-rear direction from the inner surface of the bracket 10 toward the center in the internal space 15 may be used, for example, to form the pair of the facing-each-other surfaces 16, but a forming method is not limited thereto.

The vibration proofing member 20 is formed to include contact portions 41c and attaching portions 41b, as shown in FIG. 7. The contact portions 41c and attaching portions 41b are formed on an outer surface of the upper member 41 of the second attaching member 40 and extend in the right-left direction. In the present embodiment, the contact portions 41c and attaching portions 41b are formed on the front and rear side portions of the upper member 41, as shown in FIG. 3. Note that the front and rear contact portions 41c are symmetric to each other in the front-rear direction, and so are the front and rear attaching portions 41b.

The contact portion 41c is formed by the upper peripheral wall portion 41a of the upper member 41 and an elastic member 41e covering an outer surface of the upper peripheral wall portion 41a. In the present embodiment, the elastic member 41e covering the upper peripheral wall portion 41a is formed by a part of the insulator 50. The contact portion 41c is a portion to be pressed against the press-fit surface 17, when the vibration proofing member 20 is assembled to the bracket 10. A side surface of the contact portion 41c has the same shape as the press-fit surface 17. The contact portion 41c is formed in a band shape from the right edge to left edge of the upper member 41, as shown in FIG. 7.

The attaching portion 41b is formed along the lower edge of the contact portion 41c. The attaching portion 41b is formed from the right edge to left edge of the upper member 41. The attaching portion 41b is formed by the protruding portion 41f and an elastic member 41g covering the protruding portion 41f. The attaching portion 41b is covered with the elastic member 41g on all surfaces facing the surfaces inside the press-fit groove 18. In the present embodiment, the elastic member 41g covering the protrusion 41f is formed by a part of the insulator 50.

The attaching portion 41b is a portion to be press-fitted into the press-fit groove 18, when the vibration-proof member 20 is assembled to the bracket 10. A side surface, upper surface, and lower surface of the attaching portion 41b are pressed against the groove bottom surface 18a, upper groove side surface 18b, and lower groove side surface 18b inside the press-fit groove 18, respectively. In this manner, the attaching portion 41b and the press-fit groove 18 are fitted in close contact with each other.

Note that the vibration proofing member 20 of the present embodiment is formed with claw portions 41d at the left end of the attaching portions 41b, as shown in FIG. 7. The claw portion 41d enters a recess 18c formed on the left end of the groove bottom surface 18a inside the press-fit groove 18, as shown in FIG. 4, when the attaching portion 41b is press-fitted into the press-fit groove 18. As described above, the present embodiment is configured so that the claw portion 41d is locked in the recess 18c to prevent the vibration proofing member 20 from coming off the bracket 10, even if the retaining force between the bracket 10 and the vibration proofing member 20 due to press-fitting is reduced.

When the vibration proofing member 20 is assembled into the bracket 10, the vibration proofing member 20 is inserted into the internal space 15 of the bracket 10 from the left side, as shown in FIG. 2. At this time, the contact portion 41c of the vibration proofing member 20 is overlapped with the press-fit surface 17 of the bracket 10 from the left side, and the attaching portion 41b of the vibration proofing member 20 is inserted into the press-fit groove 18 of the bracket 10 from the left side. In addition, the lower member 42 of the second attaching member 40 is overlapped with the upper surface of the bottom portion 13 of the bracket 10

Once the vibration proofing member 20 is arranged in the internal space 15 of the bracket 10 as described above, the contact portion 41c of the vibration proofing member 20 is pressed against the press-fit surface 17 of the bracket 10, and the attaching portion 41b of the vibration proofing member 20 is press-fitted into the press-fit groove 18 of the bracket 10. As a result, the vibration proofing member 20 is fixed to the bracket 10.

The vibration proofing device 1 as described above includes the bracket 10 having the internal space 15, and the vibration proofing member 20 inserted into the internal space 15, as shown in FIG. 1. The internal space 15 is open on the outer surface of the bracket 10. At least a pair of the facing-each-other surfaces 16, against which the vibration proofing member 20 is pressed, is formed in the inner surface of the bracket 10, as shown in FIG. 3. A distance between the pair of the facing-each-other surfaces 16 on the far side in the insertion direction of the vibration proofing member 20 is the same, in at least some regions of the bracket 10, as that on the near side in the insertion direction.

In the present embodiment, the vibration proofing member 20 is pressed against, in a state of being caught between, the pair of facing-each-other surfaces 16, when the vibration proofing member 20 has been inserted into the internal space 15 of the bracket 10. Thus, the vibration proofing member 20 receives an elastic reaction force from the pair of the facing-each-other surfaces 16 of the bracket 10. The vibration proofing member 20 is caught in the middle and retained by such elastic reaction forces acting from both sides. However, in a conventional technique, the inner surface of the bracket 10 is formed to have a draft angle so as to be skewed to spread from the far side toward the near side, in order to allow the mold to be smoothly released at the time of molding the bracket 10. Thus, the elastic reaction force acting on the vibration proofing member 20 has a component in the direction opposite to the insertion direction (removal direction) of the vibration proofing member 20. Accordingly, in the conventional technique, a force in the removal direction is always applied by the elastic reaction force to the vibration proofing member 20, to have a risk that the vibration proofing member 20 could not be stably retained inside the bracket 10. In contrast, in the present embodiment, a distance between the pair of facing-each-other surfaces 16 on the far side is the same as that on the near side, and thus the elastic reaction force acting on the vibration proofing member 20 has only a component in the direction orthogonal to the insertion direction of the vibration proofing member 20. As a result, there is no force acting in the removal direction acting on the vibration proofing member 20, to allow the vibration proofing member 20 to be stably retained inside the bracket 10. Even if the areas of the bracket 10 pressed against the vibration proofing member 20 are reduced than conventional cases, the retaining force between the bracket 10 and the vibration proofing member 20 is secured. In other words, the present embodiment provides the vibration proofing device 1 to allow for compactly configuring the device as a whole, while sufficiently securing the retaining force between the bracket 10 and the vibration proofing member 20.

In addition, in the present embodiment, the at least a pair of the facing-each-other surfaces 16 includes the pair of the press-fit surfaces 17 and the pair of the groove bottom surfaces 18a, each being a pair of horizontally-facing-each-other surfaces, facing each other in the horizontal direction. In this configuration, the vibration proofing member 20 is caught in the middle by elastic reaction forces acting from both sides in the horizontal direction, and is stably retained inside the bracket 10.

Further, in the present embodiment, the at least a pair of facing-each-other surfaces 16 includes the pair of the groove side surfaces 18b, which is a pair of vertically-facing-each-other surfaces, facing each other in the vertical direction. In this configuration, the vibration proofing member 20 is caught in the middle by elastic reaction forces acting from both sides in the vertical direction, and is stably retained inside the bracket 10.

Still further, in the present embodiment, the pair of the press-fit grooves 18, into which the pair of the attaching portions 41b formed on the vibration proofing member 20 is press-fitted, is formed in the inner surface of the bracket 10 at positions horizontally facing each other. The pair of press-fit grooves 18 extends from the opening edge of the internal space 15 toward the far side. The at least a pair of the facing-each-other surfaces 16 includes the pair of the groove bottom surfaces 18a, facing each other in the horizontal direction of the pair of the press-fit grooves 18, and the pair of the groove side surfaces 18b, facing each other in the vertical direction of the press-fit grooves 18. In this configuration, the pair of the attaching portions 41b of the vibration proofing member 20 is caught in the middle by elastic reaction forces acting from both sides in the horizontal direction due to the pair of the groove bottom surfaces 18a. Additionally, the pair of the attaching portions 41b is caught in the middle by elastic reaction forces acting from both sides in the vertical direction due to the pair of groove side surfaces 18b. In this manner, the surfaces inside the press-fit groove 18 allow for using a small space to secure the areas of the bracket 10 pressing against the vibration proofing member 20. This allows for compactly configuring the vibration proofing device 1 as a whole, while sufficiently securing the retaining force between the bracket 10 and the vibration proofing member 20.

Still further, in the present embodiment, the surfaces of the attaching portion 41b facing the surfaces inside the press-fit groove 18 are covered with the elastic member 41g. In this configuration, the elastic member 41g is caught between the surfaces inside the press-fit groove 18 and the outer surfaces of the attaching portion 41b, to allow the attaching portion 41b to be reliably press-fitted into the press-fit groove 18.

Still further, in the present embodiment, the pair of press-fit surfaces 17 is formed in the inner surface of the bracket 10 at positions facing each other in the horizontal direction, to have the pair of the contact portions 41c, formed on the vibration proofing member 20, respectively press-fitted. The pair of press-fit surfaces 17 extends from the opening edge of the internal space 15 toward the far side. The at least a pair of the facing-each-other surfaces 16 includes the pair of press-fit surfaces 17. In this configuration, the pair of the contact portions 41c of the vibration proofing member 20 is caught in the middle by elastic reaction forces acting from both sides in the horizontal direction due to the pair of the press-fit surfaces 17.

Still further, in the present embodiment, the bracket 10 includes the top portion 11 and the two leg portions 12 extending downward from the top portion 11, and defines the internal space 15 between the two leg portions 12. The inner surface of the leg portion 12 is formed with the at least a pair of the facing-each-other surfaces 16. This configuration sufficiently secures the retaining force between the bracket 10 and the vibration proofing member 20, without increasing the heights of the facing-each-other surfaces 16, to allow for reducing the heights of the bracket 10 and the vibration proofing member 20.

Hereinabove, the embodiment of the present invention has been described, but the present invention is not limited thereto and can be appropriately modified within the scope of the present invention. In the present embodiment, the vibration proofing member 20 of a liquid-sealed type is used, as shown in FIG. 2, but the vibration proofing member 20 is not limited to a liquid-sealed type. For example, the vibration proofing member 20 may not be provided with the main liquid chamber 1a nor the auxiliary liquid chamber 1b.

In the vibration proofing device 1 of the present embodiment, the second attaching member 40 is composed of the upper member 41 and lower member 42, but the upper member 41 and lower member 42 may be integrated together.

In the vibration proofing device 1 of the present embodiment, the elastic members 41e and 41g covering the contact portion 41c and attaching portion 41b of the upper member 41 may be formed therein with slits and dents. With this configuration, when the vibration proofing member 20 is press-fitted into the bracket 10, a part of the insulator 50 covering the contact portion 41c and the attaching portion 41b bends to facilitate press-fitting the vibration proofing member 20 into the bracket 10.

Figure 8:
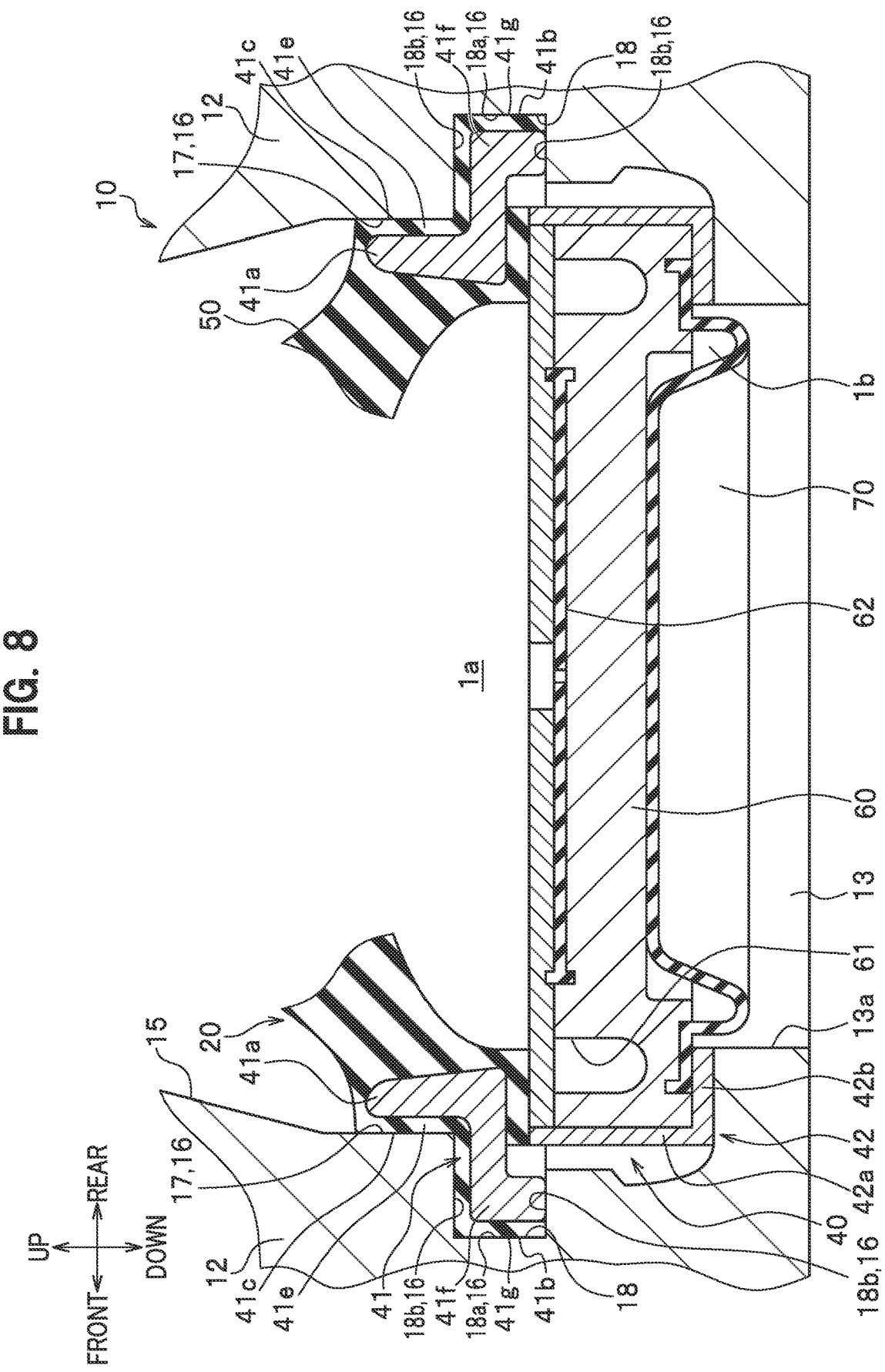
FIG. 8 is an enlarged cross-sectional view of a modification of the assembly structure of the vibration proofing device according to the embodiment of the present invention.

Note that the surfaces of the contact portion 41c and the attaching portion 41b may not be entirely in contact with the press-fit surface 17 and the surfaces inside the press-fit groove 18, to have the surfaces of the contact portion 41c and the attaching portion 41b partly separated from the press-fit surface 17 and the surfaces inside the press-fit groove 18, respectively. In addition, all the surfaces of the attaching portion 41b facing the surfaces inside the press-fit groove 18 are covered with the elastic member 41g in the above-described embodiment, as shown in FIG. 3, but are not limited thereto. The surfaces of the attaching portion 41b facing the surfaces inside the press-fit groove 18 may be configured to be partly covered with the elastic member 41g. For example, as shown in FIG. 8, the surfaces of the attaching portion 41b facing the groove bottom surface 18a and upper groove side surface 18b inside the press-fit groove 18 may be covered with the elastic member 41g, leaving the surface of the attaching portion 41b facing the lower groove side surface 18b inside the press-fit groove 18 not covered with the elastic member 41g. In this case, the contact between the lower surface of the attaching portion 41b and the lower groove side surface 18b inside the press-fit groove 18 is a resin-to-resin contact. Further, the surfaces of the contact portion 41c and the attaching portion 41b may not be covered with the elastic members 41e and 41g.

In the vibration proofing device 1 of the present embodiment, the bracket for the engine is inserted into the attaching hole 35 of the first attaching member 30, but the way of fixing the bracket for the engine to the first attaching member 30 is not limited thereto. For example, the first attaching member 30 may be fixed by bolts to the bracket for the engine.

The vibration proofing device 1 of the present embodiment is interposed between the engine and the vehicle body, but the object of vibration proofing to which the vibration proofing device of the present invention can be applied is not limited thereto. For example, the object of vibration proofing may be an inverter, a battery, or the like other than a prime mover such as an engine or a motor. In addition, the shapes of the bracket for the engine and the bracket for the vehicle body are appropriately defined according to the shape of a device as an object of vibration proofing.

LEGEND FOR REFERENCE NUMERALS

1: vibration proofing device, 10: bracket, 11: top portion, 12: leg portion, 15: internal space, 16: facing-each-other surface, 17: press-fit surface (facing-each-other surface), 18: press-fit groove, 18a: groove bottom surface (facing-each-other surface), 18b: groove side surface (facing-each-other surface), 20: vibration proofing member, 30: first attaching member, 40: second attaching member, 41: upper member, 41a: upper peripheral wall portion, 41b: attaching portion, 41c: contact portion, 41e: elastic member, 41f: protruding portion, 41g: elastic member, 42: lower member, and 50: insulator.

The invention claimed is:

1. A vibration proofing device comprising:
a bracket having an internal space; and
a vibration proofing member inserted into the internal space,
wherein
the internal space is open on an outer surface of the bracket,
the bracket is formed, in an inner surface thereof, with at least a pair of facing-each-other surfaces, against which the vibration proofing member is pressed,
a distance between the at least a pair of facing-each-other surfaces on a far side in an insertion direction of the vibration proofing member is the same, in at least some regions of the bracket, as that on a near side in the insertion direction,
a pair of press-fit grooves, into which a pair of attaching portions formed on the vibration proofing member is press-fitted, is formed in an inner surface of the bracket at positions horizontally facing each other, so as to extend from an opening edge of the internal space toward the far side,
a pair of press-fit surfaces is formed in the inner surface of the bracket at positions facing each other in the horizontal direction so as to extend from the opening edge of the internal space toward the far side, to have a pair of contact portions, formed on the vibration proofing member, respectively press-fitted, each of the pair of press-fit grooves is formed along a lower edge of each of the pair of press-fit surfaces, and is recessed outward with respect to said each of the pair of press-fit surfaces, the at least the pair of facing-each-other surfaces includes a pair of groove bottom surfaces, facing each other in a horizontal direction of the pair of press-fit grooves, a pair of upper and lower groove side surfaces, facing each other in a vertical direction of each of the press-fit grooves, and the pair of press-fit surfaces, and the vibration proofing member is fixed to the bracket by the pair of contact portions being pressed against the pair of press-fit surfaces and the pair of attaching portions being press-fitted into the pair of press-fit grooves, with the pair of attaching portions horizontally caught between the pair of groove bottom surfaces with no gap between the pair of attaching portions and respective groove bottom surfaces of the pair of groove bottom surfaces in a horizontal direction of the vibration proofing device, and each of the pair of attaching portions vertically caught between the pair of upper and lower groove side surfaces with no gap between each of the pair of attaching portions and a respective pair of the pair of upper and lower groove side surfaces in a vertical direction of the vibration proofing device.

2. The vibration proofing device according to claim 1, wherein
surfaces of each of the pair of attaching portions facing the surfaces inside each of the pair of press-fit grooves are covered with an elastic member.

3. The vibration proofing device according to claim 1, wherein
the bracket includes a top portion and two leg portions extending downward from the top portion, to define the internal space between the two leg portions, and
inner surfaces of the leg portions are formed with the at least a pair of facing-each-other surfaces.

4. The vibration proofing device according to claim 1, wherein
the vibration proofing member includes a first attaching member, a second attaching member, and an insulator interposed between the first attaching member and the second attaching member,
the pair of contact portions and the pair of attaching portions are formed on outer surfaces of the second attaching member,
the pair of contact portions are respectively formed by an upper peripheral wall portion and an elastic member covering an outer surface of the upper peripheral wall portion,
the pair of attaching portions are respectively formed by a protruding portion protruding outward from a lower end of the upper peripheral wall portion, and an elastic member covering the protruding portion, and
the elastic member covering the upper peripheral wall portion and the elastic member covering the protruding portion are formed by a part of the insulator.

5. The vibration proofing device according to claim 1, wherein
surfaces of each of the pair of attaching portions facing each of the pair of groove bottom surfaces and the upper groove side surface are covered with an elastic member, leaving a surface of each of the pair of attaching portions facing the lower groove side surface not covered with the elastic member.

6. The vibration proofing device according to claim 1, wherein
the vibration proofing member includes an upper peripheral wall portion in a tubular shape, and a protruding portion protruding outward from a lower end of the upper peripheral wall portion,
each of the pair of attaching portions is formed by the protruding portion, and
each of the pair of contact portions is formed by the upper peripheral wall portion.

7. A bracket having an internal space into which a vibration proofing member is inserted, wherein
the internal space is open on an outer surface of the bracket,
the bracket is formed, in an inner surface thereof, with at least a pair of facing-each-other surfaces, against which the vibration proofing member is pressed, and
a distance between the at least a pair of facing-each-other surfaces on a far side in an insertion direction of the vibration proofing member is the same, in at least some regions of the bracket, as that on a near side in the insertion direction,
a pair of press-fit grooves, into which a pair of attaching portions formed on the vibration proofing member is press-fitted, is formed in an inner surface of the bracket at positions horizontally facing each other, so as to extend from an opening edge of the internal space toward the far side,
a pair of press-fit surfaces is formed in the inner surface of the bracket at positions facing each other in the horizontal direction so as to extend from the opening edge of the internal space toward the far side, to have a pair of contact portions, formed on the vibration proofing member, respectively press-fitted,
each of the pair of press-fit grooves is formed along a lower edge of each of the pair of press-fit surfaces, and is recessed outward with respect to said each of the pair of press-fit surfaces,
the at least the pair of facing-each-other surfaces includes a pair of groove bottom surfaces, facing each other in a horizontal direction of the pair of press-fit grooves, a pair of upper and lower groove side surfaces, facing each other in a vertical direction of each of the pair of press-fit grooves, and the pair of press-fit surfaces, and
the vibration proofing member is fixed to the bracket by the pair of contact portions being pressed against the pair of press-fit surfaces and the pair of attaching portions being press-fitted into the pair of press-fit grooves, with the pair of attaching portions horizontally caught between the pair of groove bottom surfaces with no gap between the pair of attaching portions and respective groove bottom surfaces of the pair of groove bottom surfaces in a horizontal direction of the vibration proofing device, and each of the pair of attaching portions vertically caught between the pair of upper and lower groove side surfaces with no gap between each of the pair of attaching portions and a respective pair of the pair of upper and lower groove side surfaces in a vertical direction of the vibration proofing device.

* * * * *